US007017190B2

(12) United States Patent
Weber

(10) Patent No.: US 7,017,190 B2
(45) Date of Patent: Mar. 21, 2006

(54) PORTABLE RECORDABLE MEDIA ANTI-THEFT SYSTEM

(76) Inventor: Warren D. Weber, 15718 - 53rd Pl. W., Edmonds, WA (US) 98026

( * ) Notice: Subject to any disclaimer, the term of this patent is extended or adjusted under 35 U.S.C. 154(b) by 846 days.

(21) Appl. No.: 10/102,096

(22) Filed: Mar. 19, 2002

(65) Prior Publication Data

US 2002/0136404 A1   Sep. 26, 2002

Related U.S. Application Data

(60) Provisional application No. 60/277,798, filed on Mar. 21, 2001.

(51) Int. Cl.
*H04L 9/32* (2006.01)
(52) U.S. Cl. .................. 726/27; 713/172; 713/193; 369/84; 360/60; 705/51; 705/57; 380/201; 726/26; 726/28; 726/30; 726/32
(58) Field of Classification Search .......... 380/201; 713/172, 189, 191–193; 360/60; 369/84, 369/282, 44.32, 44.33; 705/51, 57; 726/26–28, 726/30, 32
See application file for complete search history.

(56) References Cited

U.S. PATENT DOCUMENTS 4,757,534 A * 7/1988 Matyas et al. ............... 705/56

(Continued)

FOREIGN PATENT DOCUMENTS

WO          0984346 A1 *  3/2000

OTHER PUBLICATIONS

Intel Corporation, International Business Machines Corporation, Matsushita Electric Industrial Co., Ltd, Toshiba Corporation, "Content Protection for Prerecorded Media Specification DVD Book", Revision 0.93, Jan. 31, 2001.*

*Primary Examiner*—Matthew Smithers
*Assistant Examiner*—Minh Dieu Nguyen
(74) *Attorney, Agent, or Firm*—Dean A. Craine

(57) ABSTRACT

An anti-theft system for a portable recordable media that contains a downloadable, user-sensitive software program files or data that the publisher wants to prevent multi-installations and unauthorized copying. The system uses three separate components—a portable recordable media, a linking object, and a second recordable media. In the preferred embodiment, the portable recordable media is a CD or DVD disc body with a unique first code number encoded into the software program files or data identifying the particular copy of the software program files or data. In the preferred embodiment, the linking object is a removable plug that fits into the center spindle hole formed in the disc body. Encoded into the linking object is a unique, temporary second code number that is associated or encoded with a plurality of alphanumeric characters also used in the first code number. In the preferred embodiment, the second recordable media is a programmable plug card that has a third code number encoded with alphanumeric characters used with the linking object. The plug card includes a port that enables the plug to be removed from the disc body and connected to the plug card. When the software program is initially installed into the computer, the software program examines the second code number and third code number to determine whether they are compatible so that installation may continue. If they are not compatible, installation is aborted. During use, the plug card must be inserted into the reader so that the software program loaded from the disc body or hard drive, may determine whether the user is authorized.

20 Claims, 4 Drawing Sheets

U.S. PATENT DOCUMENTS

| | | | |
|---|---|---|---|
| 4,866,769 A * | 9/1989 | Karp | 705/56 |
| 5,222,133 A * | 6/1993 | Chou et al. | 705/55 |
| 5,347,508 A | 9/1994 | Montbriand et al. | 369/273 |
| 5,699,047 A | 12/1997 | Tsai et al. | 340/572 |
| 5,825,292 A | 10/1998 | Tsai et al. | 340/572 |
| 5,905,798 A * | 5/1999 | Nerlikar et al. | 705/57 |
| 6,005,940 A * | 12/1999 | Kulinets | 705/51 |
| 6,356,517 B1 * | 3/2002 | Liu et al. | 369/14 |

* cited by examiner

PORTABLE RECORDABLE MEDIA ANTI-THEFT SYSTEM

This is a utility patent application based on a provisional patent application (Ser. No. 60/277,798) filed on Mar. 21, 2001.

BACKGROUND OF THE INVENTION

1. Field of the Invention

This invention pertains to anti-theft systems, and more particularly to anti-theft systems used to prevent unauthorized copying of software programs or data stored on a portable recordable media.

2. Description of the Related Art

Portable optical recordable discs, such as CDs, DVDs etc. are very popular. Each year billions of dollars are lost due to theft or unauthorized copying of the programs or files stored on these discs.

One common method used to prevent unauthorized copying or use of a CD or DVD is the use of a code made of a plurality of alphanumeric characters that must be typed into the computer before the program on the disc can be installed on the computer hard drive or used. Many software programs manufactured and sold by Microsoft Corporation, of Redmond, Wash., for example, require the user to type into the computer a unique 25-character alphanumeric code, called a "Product Key" code, during the installation process. The "Product Key" code is usually printed on an adhesive label attached to the original shipping container or sleeve. During the installation process, the software program asks the user to type the "Product Key" code into the computer. If the wrong "Product Key" code is entered, the installation process automatically aborts.

Software programs that require users to enter a "Product Key" code during installation are known as double encryption security systems. A major drawback with such systems is that they do not prevent multiple installations of the software program or disc copying.

Recently, Microsoft Corporation has developed a new scheme to prevent a software program from being used on multiple computer components. The software program requires the user to register the software program within a selected time period. If the software program is not registered within the time period, it automatically stops functioning. During the installment process, the software program scans the computer configuration. During the registration process the computer transmits a record of the configuration files along with the user's personal information. Some users find this scheme too intrusive.

One possible method of preventing multiple installations and unauthorized copying of a software program is to use a triple encryption security system. Using such systems, the software program requires two unique alphanumeric codes to be entered for installation. If both alphanumeric codes are correct, installation continues. If either one of the alphanumeric codes is incorrect, installation is aborted.

It is anticipated that cashless societies will soon develop where credit cards, prepaid debit cards, or transportation cards with built in programmable computer chips (i.e. EPROM) will be widely used. Such cards, also known as "Smart Cards", are used with stand alone or peripheral reading and writing devices for computers that enable a card holder to enter and store information on the card when conducting transactions. Such cards typically use a double encryption security system that requires the cardholder to enter his or her password when the card is placed into the reader. While "Smart Cards", may be very convenient, computer-skilled thieves can easily determine the password from the card.

What is needed is an improved portable recordable media with downloadable files or data that uses a triple encryption security system to prevent multiple installations and unauthorized copying.

SUMMARY OF THE INVENTION

It is an object of the present invention to provide an improved portable recordable media anti-theft system that prevents unauthorized multiple installations and unauthorized copying of files or data from the media.

It is another object of the present invention to provide such a system that uses triple encryption.

It is another object of the present invention that is easy and economical to implement.

These and other objects of the invention which will become apparent are met by an anti-theft system for use with an portable recordable media, such as a CD or DVD, with a user-sensitive software program or other files loaded therein that the publisher wants to protect from unauthorized multiple installation or unauthorized copying. Triple encryption is produced by encoding into the portable recordable media a unique first code number. Distributed with the recordable media is a unique second code number that is encoded and identified by the software program files or data on the portable recordable media. In the preferred embodiment, the second code number is encoded into a removable, programmable plug that fits into the center hole of the CDs or DVDs disc body. The system also uses a second recordable media that includes a separate memory means with a third code number encoded therein. In the preferred embodiment, the second recordable media, hereinafter called a plug card, is a credit card-size card with a built-in programmable computer chip. Formed on the plug card is a circular port capable of selectively receiving the removable plug that accompanies the disc body.

In the preferred embodiment, the first code member comprises a plurality of alphanumeric characters. The second code number encoded into the removable plug also comprises a plurality of alphanumeric characters with some characters being common with the characters used in the first code number. Encoded into the plug card memory chip is a third code number comprising a unique plurality of alphanumeric characters with at least some of the numbers being common with the characters used in the second code number.

During installation, the removable plug is manually removed from the disc body and inserted into the port on the plug card. The disc body and the second recordable media are then placed into their respectable players and readers. During the installation process, the computer operating software program or new software program automatically requests or downloads the second code number from the plug via the plug card reader. If the plug is not placed into the port, the operating software program or the new software program may request that the user manually enter the second code number, if known, into the computer. Next, the operating software program or new software program also requests or downloads the third code number from the plug card. The user-sensitive software program then determines whether the second code number and the third code number are being used. If either an incorrect second code number or the third code number is used, installation is aborted. By encoding the three codes numbers and then reviewing them, an anti-theft system that uses triple encryption is provided.

If all of the code numbers are correct and installation is completed, the system may be designed so that the plug may be removed from the plug card and stored in the disc body for future installations. Since the plug cannot be duplicated, unauthorized copies of the software program or files on the disc body cannot be reinstalled in other computers. The system can also be designed so that each time the installed software program is run from the computer hard drive, the plug card must be placed into the reader so that the presence of the second code number may be determined by the software program. In this particular system design, if no plug card is placed into the reader or if the wrong plug card is used, the installed software program cannot be executed from the hard drive. Since the second code number from the plug card cannot be easily determined or copied, unauthorized copies of the software program are also non-functional.

In another system design, a registering entity may be provided that receives registration information from the user when the software program is initially installed into the computer. When registration is completed, the registering entity then transmits a replacement code number to the user that replaces either the second code number on the plug or the third code number on the plug card. Each time the user purchases and registers new software programs, a new replacement code number could be transmitted to the plug or plug card. Over time, the plug or plug card may include a plurality of replacement code numbers that enable the user to run multiple software programs from his or her computer hard drive without having to replace the plug or plug card each time a new software program is executed.

In still another embodiment of the system, the plug could include an anti-tampering means that causes the plug memory chip to erase the second code number when the plug is disassembled. This feature would serve as an additional security means to prevent thieves from downloading the second code number directly from the plug.

In summary, multiple installations and unauthorized copying of the software program or files on the media is prevented by the system by using a three separate programmable structures each having a linked, unique second code number which must be initially used together when initially installing the software program and which also must be used to run the program. The three components must be designed to prevent physical duplication. The three code numbers can be encoded onto the separate three components or encoded into two components. Because the familiar components are used, the system also is convenient.

Another important aspect of the system is that distribution of the first code numbers, second code numbers, the third code numbers, the replacement code numbers, and the plug cards may be controlled by the software publisher and used as a source of revenue to offset lost sales from unauthorized multi-installations or copying. The plugs and plug cards may also be standardized so that a plurality of different software publishers may participate and use the system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

DESCRIPTION OF THE PREFERRED EMBODIMENT(S)

Figure 1:
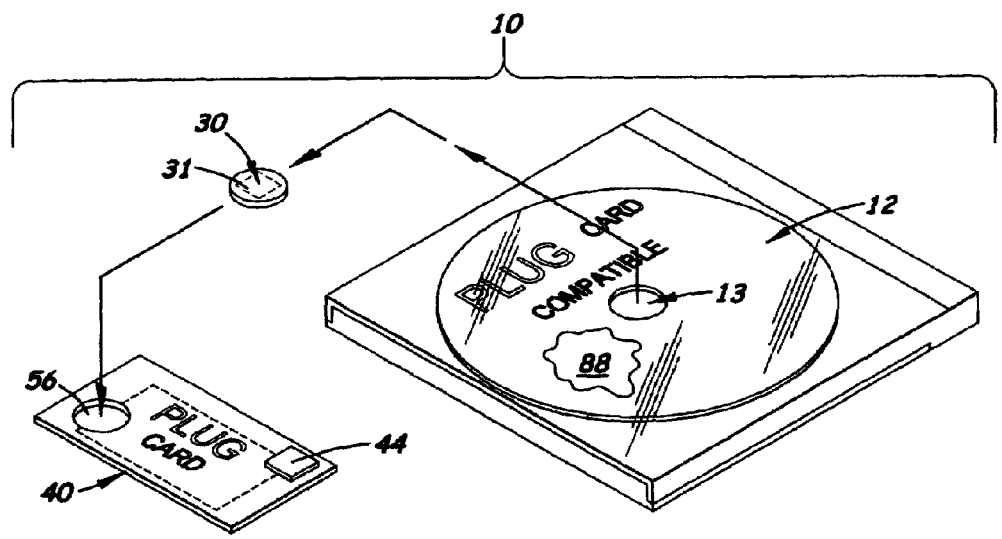
FIG. 1 is an illustration of a standard CD disc body showing the plug being removed from the center hole and inserted into the port on the plug card.

Referring to the accompanying FIGS. 1–7, there is shown and described a portable, recordable media anti-theft system 10 for use with an portable recordable media, such as a CD or DVD, generally referenced as 12 with a software program or files (generally referenced as 88) loaded therein that the distributor wants to control multiple installation or prevent unauthorized copying.

The system 10 may be used with a standard size CD or DVD 12 that is distributed with a removable plug 30 which is disclosed in the pending U.S. applications (Ser. No. 09/564,454, filed on May 3, 2000, and Ser. No. 09/796,667, filed on Feb. 28, 2001) and now incorporated herein.

Encoded into the software program 88 on the disc 12 is a unique first code number 80 identifying the particular copy of the software program 88 or files. The system 10 also uses a second code number 81 that is distributed with the disc 12. In the preferred embodiment, the second code number 81 is embedded into a removable plug 30 that fits into the center hole 13 of the disc 12. The plug 30 includes a programmable EPPROM computer chip 36. The system 10 also includes a second recordable media that includes a separate memory means to record a third code number 82. In the preferred embodiment, the second recordable media is a credit card-size card, hereinafter called a plug card 40, with a built-in programmable computer chip 44. Formed in the plug card 40 is a port 56 designed to allow the plug 30 to be electrically connected to the plug card 40.

In the preferred embodiment, the plug 30 is a circular structure designed to snap-fit into the center hole 13 of the disc 12. In the embodiment shown in FIG. 3, the plug 30 includes an upper circular cap 32 that rests over the top surface of the disc 12 and a downward extending, cylindrical body 33. Located inside the body 33 is a cavity 35. Attached over the open end of the body 33 is a cap 34. Located inside the cavity 35 is the programmable computer chip 36 and a battery 37. Terminals 38, 39 are assembled on the sides of the cavity 35 which connect the battery 37 to the computer chip 36. Formed on the lower surface of the upper cap 32 are two downward extending keys 42, 43 which snap fit into complimentary shaped keyways 48, 49, respectively, formed on the top surface of the plug card 40. The keys 42, 43 and keyways 48, 49 are correctly aligned so that the user may simply insert the plug 30 into the port 56 formed on the plug card 40 and rotate the plug 30 to correctly align and attach the plug 30 onto the plug card 40. Also attached to the lower surface of the upper cap 34 are two main plug terminals 90, 92 that connect to complimentary aligned terminals 51, 52 formed on the plug card 40.

The plug card 40 is a flat, rectangular-shaped, card body approximately the same shape and size as a standard credit card. Embedded into the plug card 40 is a re-programmable computer chip 44 that connects to terminals 51, 52 disposed on the outer edge of the plug card 40. A circular port 56 is formed on one end of the plug card 40 designed to receive the plug 30 during use. In the preferred embodiment, the port 56 has two electrical terminals 51, 52 located on opposite sides of the port 56 that extend partially over the top surface of the plug card 40. As mentioned above, when the plug 30 is inserted into the port 56, the terminals 90, 92 on the plug 30 contact the terminals 51, 52, respectively, formed around the port 56 thereby electrically connecting the plug 30 to the plug card 40. Micro wiring 45, 46, constructed in the plug card 40 connects the two terminals 51, 52 to the computer chip 44. In the preferred embodiment, the computer chip 44 is a flash EPPROM capable of being downloaded to new files.

Figure 2:
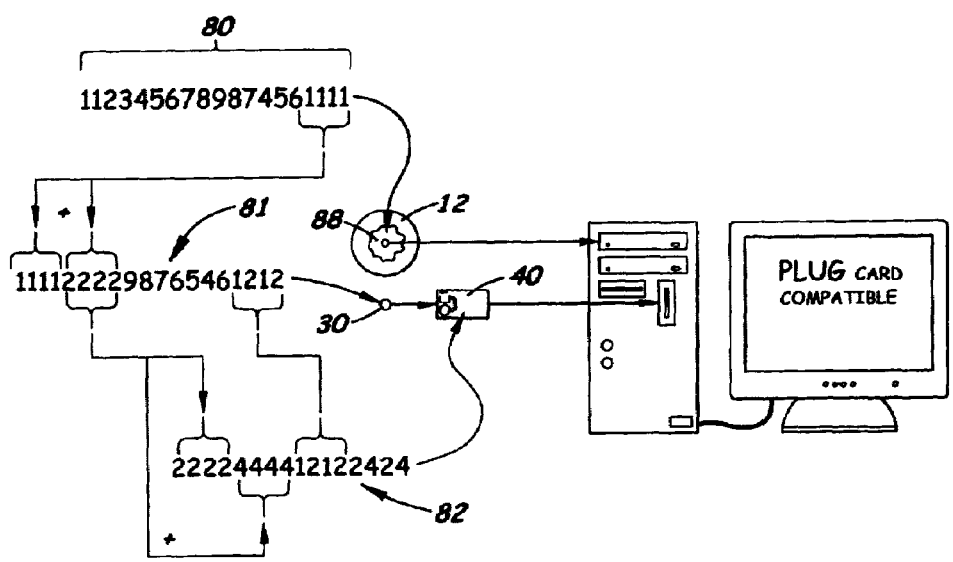
FIG. 2 is an illustration showing the use the CD disc body, plug and plug card in a computer with each component having a unique, linked encryption code number.
Figure 3:
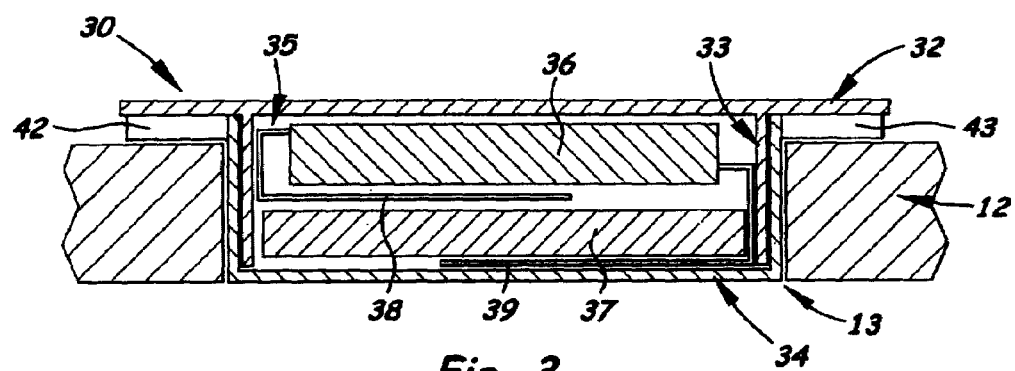
FIG. 3 is a sectional side elevational view of the plug inserted into the center hole on a CD disc body.
Figure 4:
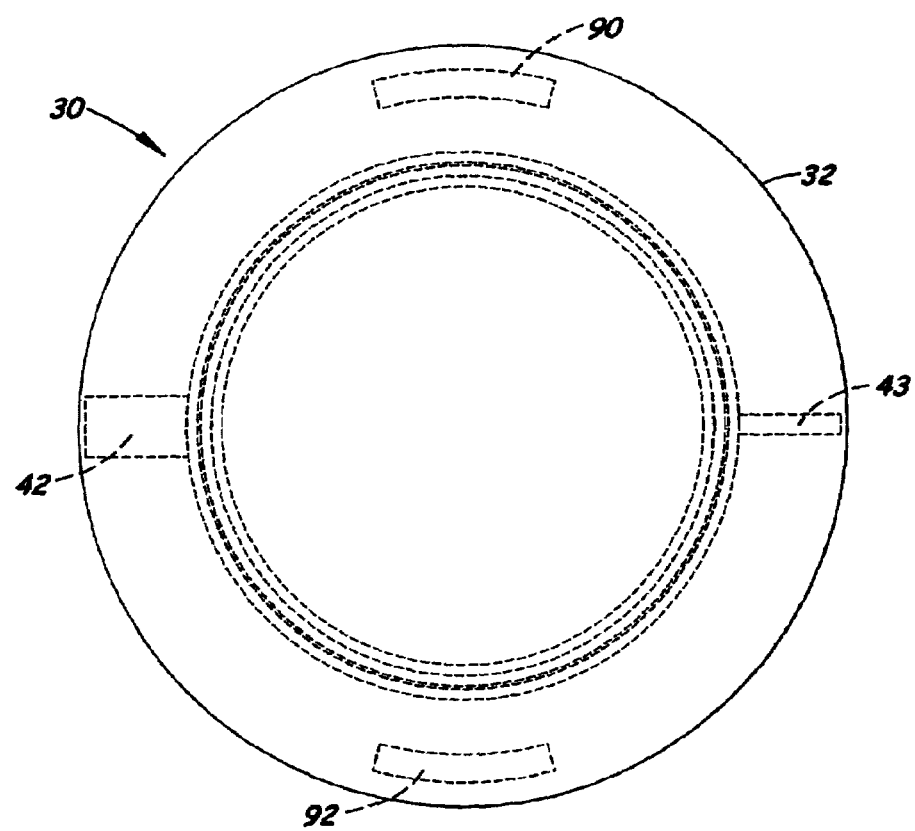
FIG. 4 is a top plan view of the plug.
Figure 5:
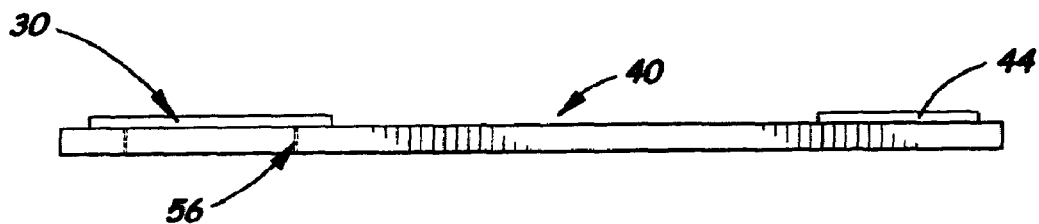
FIG. 5 is a side elevational view of the plug card with the plug attached thereto.
Figure 6:
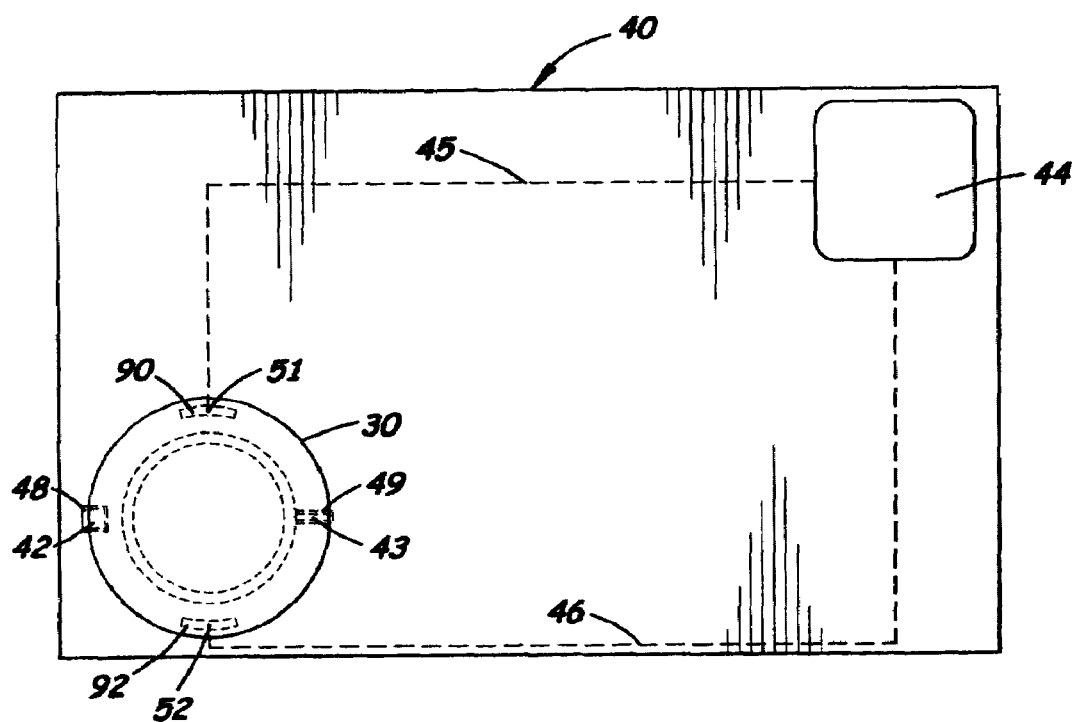
FIG. 6 is a top plan view of the plug card with a plug attached thereto as shown in FIG. 5.

Referring to FIG. 2, a first code member 80 is encoded into the software program 88. In the preferred embodiment, the first code number 80 comprises a plurality of alphanumeric characters. Loaded into the chip 36 on the plug 30 is a second code number 81, also comprising alphanumeric characters with some characters being common with the characters used in the first code number 80. Encoded into the plug card 40 is a second code number 82 with at least some of the numbers being common with the characters used in the second code number 81.

During its initial use, the plug 30 is removed from the disc 12 containing the desired software program 88 and inserted into the port 56 on the plug card 40. The disc 12 and the plug card 40 are both placed into their respective players and readers. When the installation process begins, the software program 88 may request the user to manually enter the second code number 81, if known, into the computer or it may automatically download the second code number 81 from the plug 30. The software program 88 then determines whether the first code number 80, the second code number 81 and the third code number 82 are correct. If either the second code number 81 or the third code number 82 is incorrect, installation is aborted.

If the code numbers 80, 81, 82 are correct and installation is completed, the plug 30 may be removed from the disc 12. Each time the software program is run from the computer hard drive, the plug card 40 must be placed into the reader so that the third code number 82 may be read. If no plug card 40 is placed into the reader or if the wrong plug card 40 is used, use of the software program 88 from the hard drive is prevented.

Figure 7:
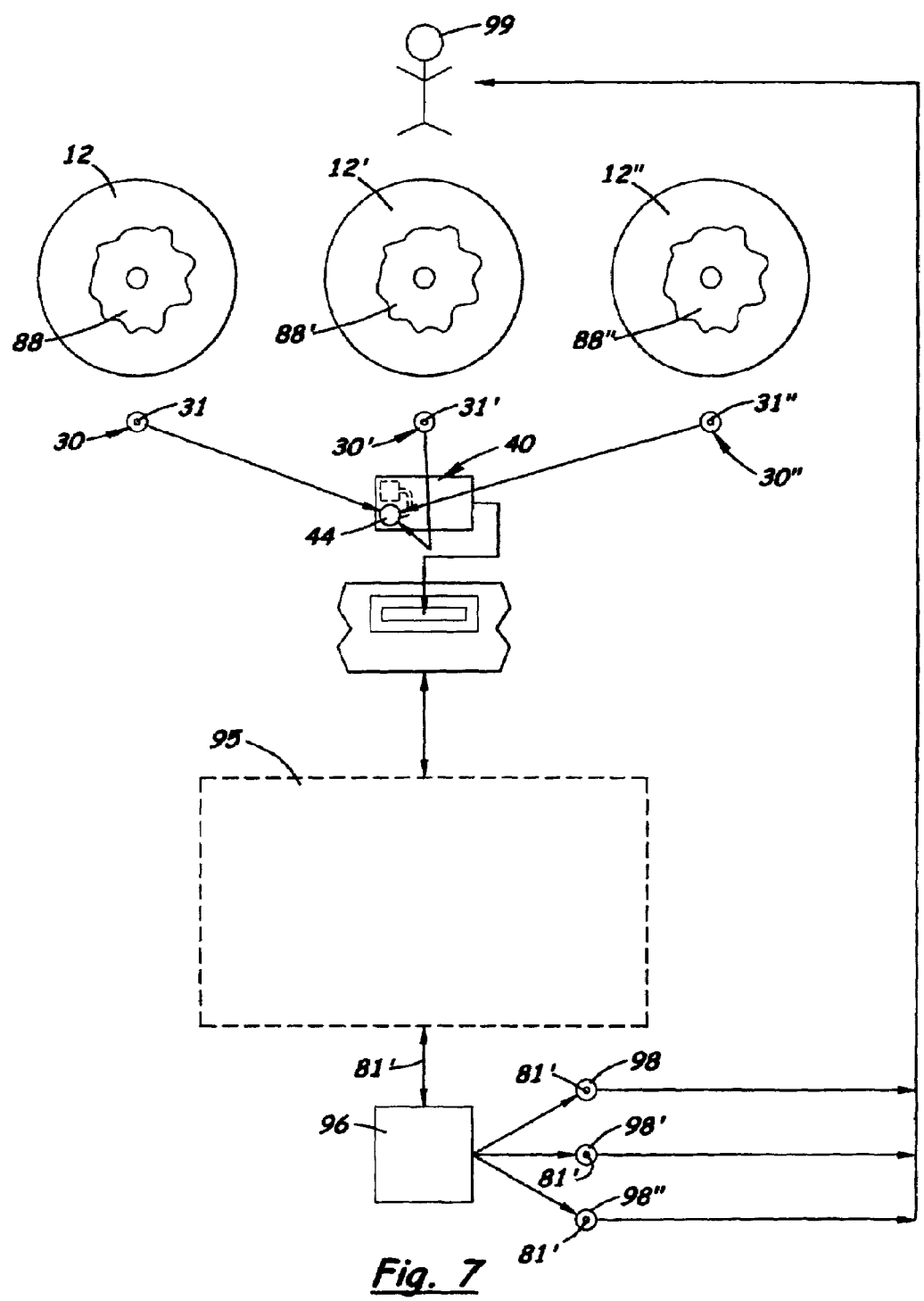
FIG. 7 is an illustration of the anti-theft system described herein.

When only double encryption is desired, the system 10', shown in FIG. 7, is used which includes a registering entity 96 which receives registration information from the user 99 and also provides a replacement third code number 82' (not shown) that replaces the third code number 82 on the plug card 40. Each time, the user purchases and registers new software programs 88, 88', 88", a new replacement third code number 82' is downloaded to the plug card 40. Over time, the plug card 40 has a plurality of replacement third code numbers downloaded thereon that enable the user to run multiple software programs 88 from his or her hard drive without having to replace the plug card 40 each time a new software program 88 is run.

When triple encryption is desired, both the plug 30 and the plug card 40 must be used each time the program is executed. With this embodiment, the second code number 81 is replaced by a permanent second code number 81' supplied by a registering entity 96 which may be used to record the names and addresses of authorized users. The registering entity 96 may send a replacement plug 98, 98', 98" with the replacement second code number 81' encoded therein or download over a wide area network 95 a replacement second code 81' to the plug card 40 which either stores the replacement second code number 81' directly on the plug card chip 44 or the plug chip 31, 31', 31" located on plugs 30, 30', 30" used with disc 12, 12', 12", respectively.

In compliance with the statute, the invention described herein has been described in language more or less specific as to structural features. It should be understood, however, that the invention is not limited to the embodiments described herein or to specific features shown, since the means and construction shown, comprised only of the preferred embodiments for putting the invention into effect. It is also understood that the phraseology and terminology employed herein are for the purpose of description and should not be regarded as limiting. The invention is therefore claimed in any of its forms or modifications within the legitimate and valid scope of the amended claims, appropriately interpreted in accordance with the doctrine of equivalents.

I claim:

1. A portable, recordable media anti-theft system, comprising:
   a. an optical disc with at least one user-sensitive computer-readable file saved thereon, said optical disc includes a center spindle hole;
   b. an optical disc reader connected to a computer;
   c. a first code number saved on said optical disc;
   d. a linking object distributed with said optical disc;
   e. a second code number recorded on said linking object;
   f. a recordable media with a programmable memory chip, said memory chip including a third code number saved thereon;
   g. means to communicate said second code number from said linking object to said recordable media;
   h. said recordable media reader connected to said computer to enable said second code number and said third code number to be communicated to said computer; and,
   i. means to verify that said first code number, said second code number and said third code number are correct so that said file may be downloaded into said computer.

2. The anti-theft system, as recited in claim 1, wherein said linking object is a plug that physically connects to said recordable media.

3. The anti-theft system as recited in claim 2, wherein said plug physically connects to said center spindle hole on said optical disc.

4. The anti-theft system, as recited in claim 3, wherein said recordable media is a card with a circular receiving port formed therein that receives said plug.

5. The anti-theft system, as recited in claim 4, wherein said circular plug includes electrical terminals that connect to said terminals formed on said plug.

6. The anti-theft system, as recited in claim 5, further including alignment means formed on said plug and said port to properly align said plug to said port.

7. The anti-theft system, as recited in claim 1, wherein said first code number and said second code number both include a plurality of encoded alphanumeric characters.

8. The anti-theft system, as recited in claim 7, wherein said second code number and said third code number each includes a plurality of encoded alphanumeric characters.

9. The anti theft system, as recited in claim 1, wherein said recordable media is a card with aport formed therein to receive said linking object.

10. The anti-theft system, as recited in claim 9, wherein said recordable media includes a port with terminals that electrically connect to said linking object when connected to said port.

11. A portable, recordable media anti-theft system, comprising:
  a. an optical disc with at least one user-sensitive computer-readable file saved thereon, said optical disc includes a center spindle hole;
  b. an optical disc reader connected to a computer;
  c. a first code number saved on said optical disc;
  d. a removable plug that fits into said center spindle hole on said optical disc;
  e. a second code number recorded on said plug encoded with said first code number;
  f. a recordable media with a programmable memory chip, said memory chip including a third code number saved thereon encoded with said second code number;
  g. means to communicate said second code number from said plug to said recordable media;
  h. said recordable media reader connected to said computer to enable said second code number and said third code number to be transmitted with the computer; and,
  i. means to determine whether said second code number and said third code number are to be used with said first code number so that said file may be run on said computer.

12. The anti-theft system, as recited in claim 11, wherein said first code number and said second code number both include a plurality of encoded alphanumeric characters.

13. The anti-theft system, as recited in claim 11, wherein said second code number and said third code number each includes a plurality of encoded alphanumeric characters.

14. The anti-theft system, as recited in claim 11, wherein said recordable media is a card with a port formed therein to receive said plug.

15. The anti-theft system, as recited in claim 14, wherein said recordable media is a card with a circular receiving port formed therein that receives said plug.

16. A portable; recordable media anti-theft system comprising:
  a. an optical disc with at least one user-sensitive computer-readable file saved thereon, said optical disc includes a center spindle hole;
  b. an optical disc reader connected to a computer;
  c. a first code number associated with said computer-readable file;
  d. a removable plug that fits into said center spindle hole on said optical disc, said plug including a memory chip;
  e. a second code number programmed into said memory chip on said plug, said second code number encoded with said first code number;
  f. a recordable media having means to connect to said plug; and,
  g. said recordable media reader connected to said computer to enable said second code number to be transmitted to the computer.

17. The anti-theft system, as recited in claim 16, wherein said means to connect to said plug on said recordable media is a receiving port used to selectively receive said plug.

18. The anti-theft system, as recited in claim 16, wherein said first code number and said second code number are encoded alphanumeric characters.

19. The anti-theft system, as recited in claim 18, further including said recordable media having a memory chip programmed with a third code number.

20. The anti-theft system, as recited in claim 19, wherein said computer readable file determines whether said first, second, and third code numbers are properly encoded before being loaded into the computer.

\* \* \* \* \*